(12) United States Patent
Guyot

(10) Patent No.: US 6,428,193 B1
(45) Date of Patent: Aug. 6, 2002

(54) DEVICE FOR CONTROLLING DOME LIGHT ILLUMINATION

(75) Inventor: Robert Guyot, Chateauroux (FR)

(73) Assignee: Mollertech SAS, Le Buisson (FR)

( * ) Notice: Subject to any disclaimer, the term of this patent is extended or adjusted under 35 U.S.C. 154(b) by 0 days.

(21) Appl. No.: 09/555,331

(22) PCT Filed: Sep. 30, 1999

(86) PCT No.: PCT/FR99/02324

§ 371 (c)(1),
(2), (4) Date: May 25, 2000

(87) PCT Pub. No.: WO00/18608

PCT Pub. Date: Apr. 6, 2000

(30) Foreign Application Priority Data

Sep. 30, 1998 (FR) .............................................. 98 12210

(51) Int. Cl.⁷ ........................... B60Q 1/26; F21V 33/00; B60J 3/00
(52) U.S. Cl. ........................ 362/492; 362/142; 362/490; 362/394; 362/137; 362/802; 296/97.5
(58) Field of Search ................................. 362/135, 137, 362/394, 490, 492, 493, 276, 802; 296/97.9, 97.12, 97.13

(56) References Cited

U.S. PATENT DOCUMENTS 6,135,610 A * 10/2000 Beck et al. .................. 362/142

FOREIGN PATENT DOCUMENTS

DE 196 50 923 A * 6/1997 .................. 362/490

* cited by examiner

Primary Examiner—Thomas M. Sember
Assistant Examiner—David V. Hobden
(74) Attorney, Agent, or Firm—Duane Morris LLP

(57) ABSTRACT

For a control rod disposed between a top corner of the sun visor and the hinge of the mirror flap on the sun visor, the end of the rod associated with the plate carries a cam that causes two electrical conductors to be pressed one against the other.

4 Claims, 3 Drawing Sheets

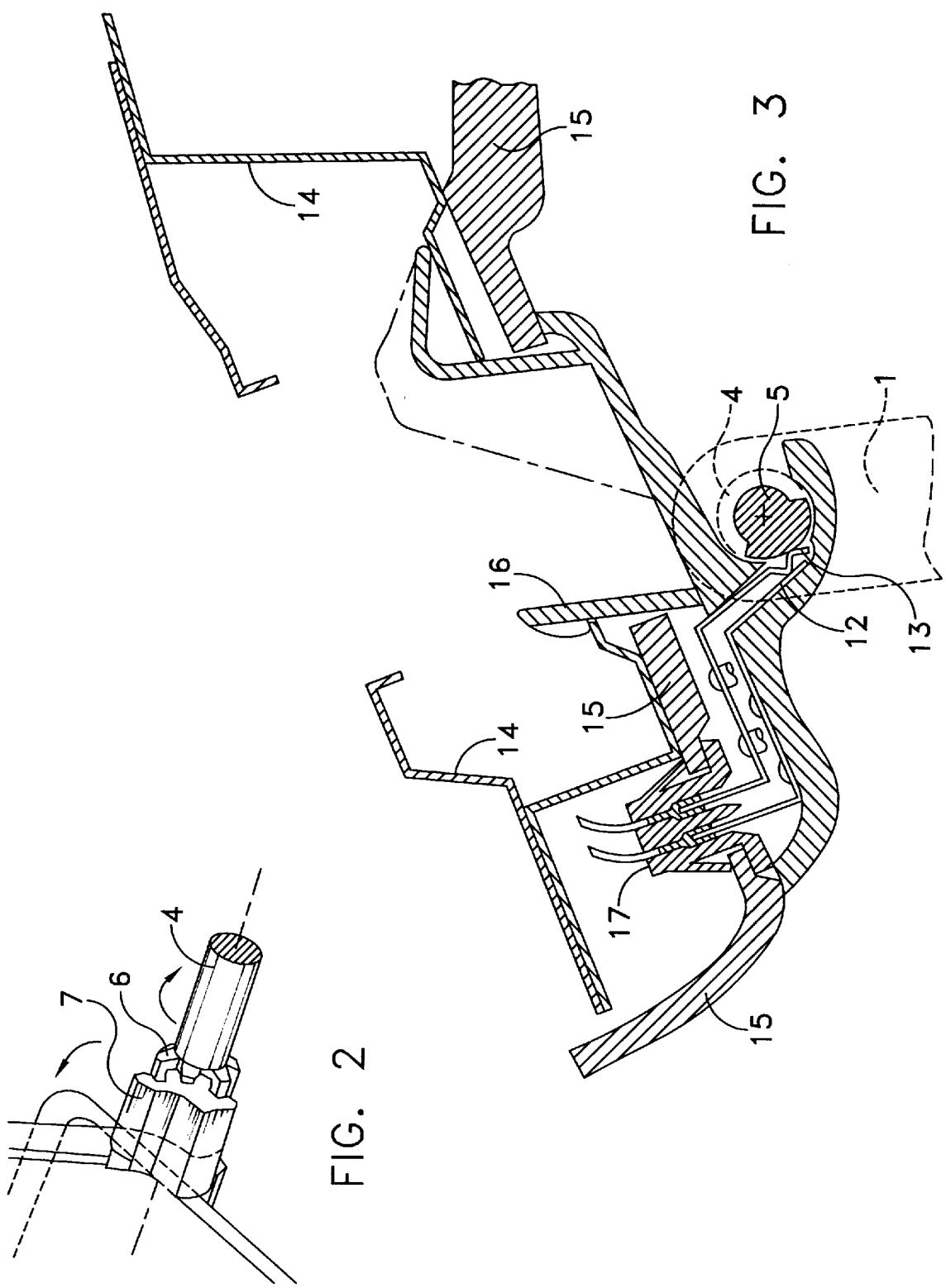

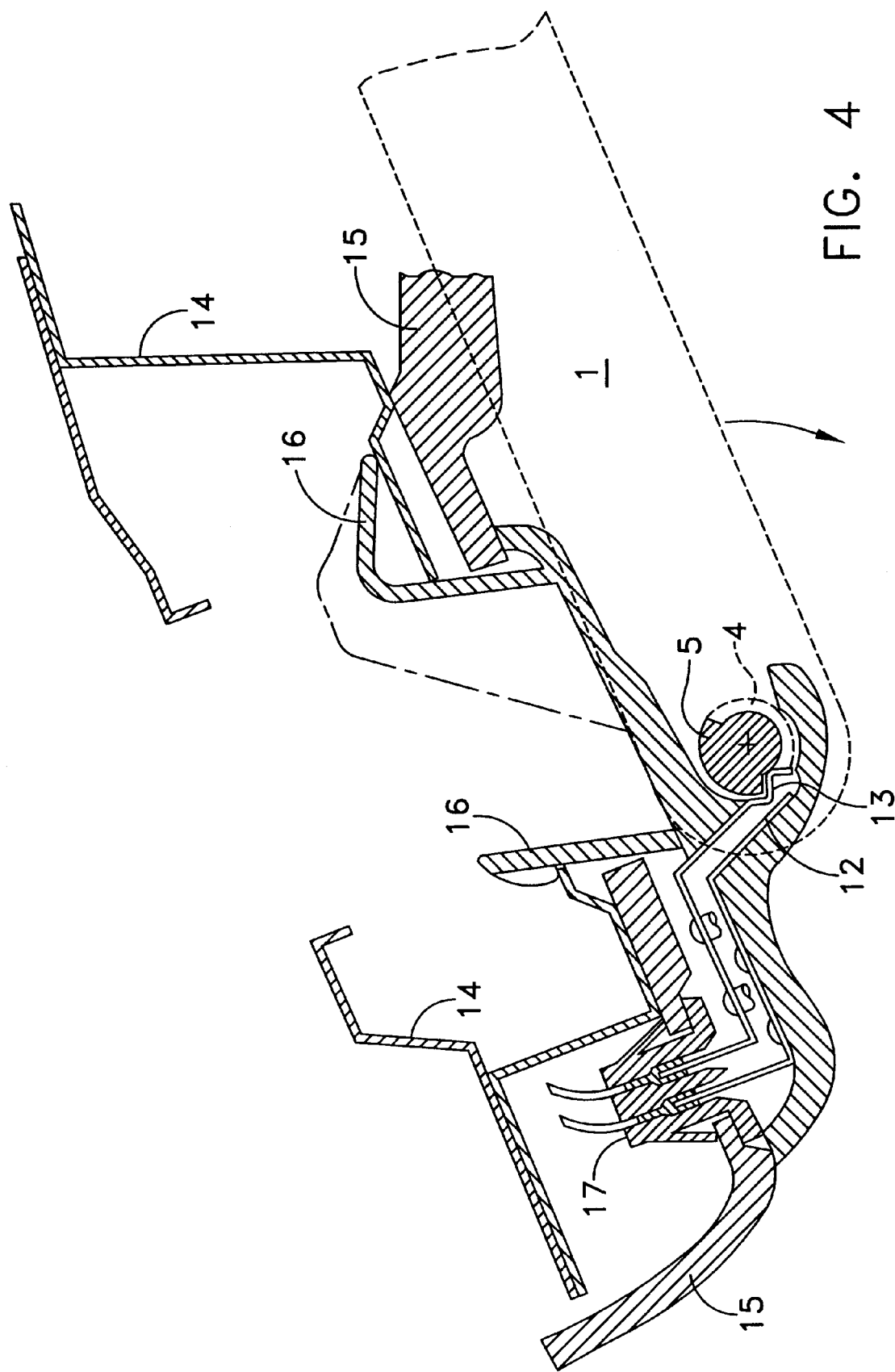

DEVICE FOR CONTROLLING DOME LIGHT ILLUMINATION

The present invention relates to a device for controlling a car dome light by moving a flap that hides a mirror included in a sun visor.

BACKGROUND OF THE INVENTION

Such mirrors, referred to as "vanity" mirrors, are known and are included in the face of a sun visor that faces towards the inside of a vehicle cabin when the sun visor is folded down. It is also known to illuminate the face of a person seeking to look in the mirror by means of electric light bulbs located around the mirror, and to switch the bulbs on by pivoting a protective flap that covers the mirror while it is not in use. The mirror must be "lit up" only when it is in its in-use position, i.e. when the sun visor is in a substantially vertical position after pivoting down through an angle of about 90° relative to the two fastenings from which it is suspended, and even then, only once the protective flap has been raised. However known devices are relatively complex and therefore expensive, and they require an electrical circuit to be present within the sun visor.

OBJECTS AND SUMMARY OF THE INVENTION

The invention provides a device for controlling lighting that is triggered by pivoting the protective flap on a courtesy mirror included in a sun visor suspended from two fastenings, respectively a central fastening and a side fastening, wherein a control rod is disposed between the central fastening and the control mechanism of the flap, said rod carrying a cam which causes two electrical conductors to be pressed one against the other, the cam being controlled by gearing driven by moving the protective flap.

The device for controlling a contactor situated in the central fastening for holding a sun visor includes a cam integrated with the shaft of the sun visor and controlled by opening the flap for covering the mirror. It is not the mirror itself which is illuminated, but moving the mirror flap causes a dome light to be switched on, thereby illuminating the person seeking to look in the mirror. It is necessary for the sun visor to be down and for the flap to be open simultaneously before the dome light is switched on to illuminate the person. The cam is integrated in the control rod and it is preferably situated at its end adjacent to the central plate in which the electrical connections are included.

When the sun visor is folded up, the protective flap bears against the roof, thereby folding it down onto the mirror and switching off the light by interrupting the electrical circuit.

BRIEF DESCRIPTION OF THE DRAWINGS

Other characteristics and advantages of the invention will appear on reading the following description of particular embodiments, given purely by way of non-limiting example, and with reference to the drawings, in which:

FIG. 2 is a detail view seen along arrow F in FIG. 1 of the link between the control rod and the protective flap;

FIG. 3 is a section view on line III—III of FIG. 1, with electrical contact being established; and FIG. 4 is a view under the same conditions with electrical contact being interrupted.

MORE DETAILED DESCRIPTION

Figure 1:
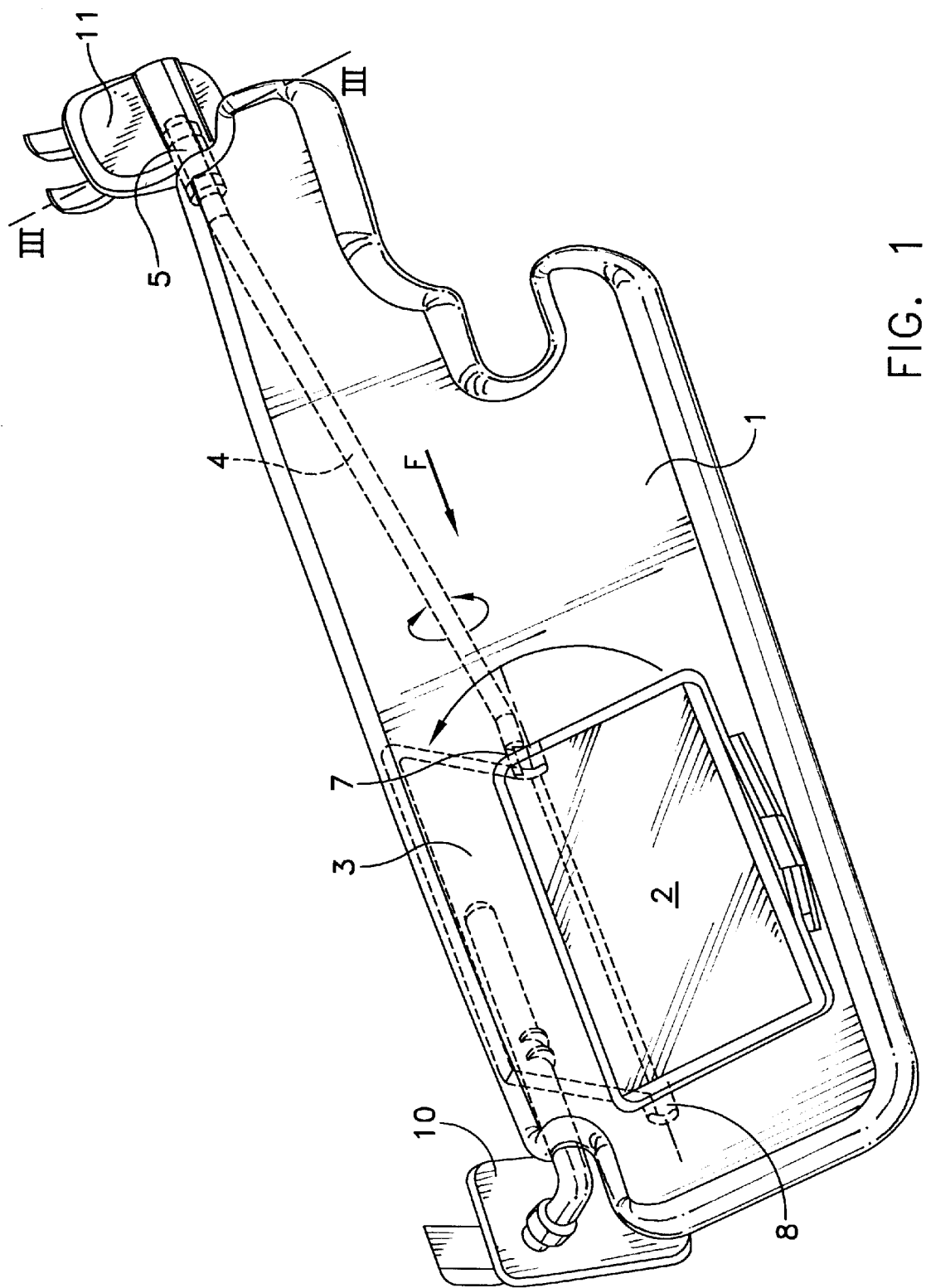
FIG. 1 is a perspective view of a device of the invention.

Throughout the figures, the same references are used to designate the same elements. In the example shown, the sun visor is on the driver's side, for a left-hand drive vehicle. The top portion of the sun visor is pivotally mounted on a central fastening carried by a plate 11 and on a lateral fastening carried by a plate 10. The lateral plate 10 serves to fix the sun visor to the vehicle and allows it to be pivoted in any direction.

In FIG. 1, there can be seen the (driver's side) sun visor 1 that is generally rectangular in shape and that is pivotally mounted between two plates 10 and 11. The sun visor 1 is mounted to pivot about a shaft connected to the lateral plate 10, so as to enable it to be placed against the front side window, whereas it is merely clipped onto the plate 11 from which it can be released. The right-hand side of the screen of the sun visor has a setback to allow the sun visor to pass over the rearview mirror. As shown in FIG. 1, the sun visor can go from a substantially horizontal position in which it bears against or is integrated against or in the roof to a substantially vertical position in which it forms a screen extending parallel to the windshield to protect against the sun's rays. It can even pivot through an angle of more than 90°. All sun visors present this configuration. In conventional manner, a mirror 2 is integrated in the surface of the sun visor that faces towards the inside of the cabin. The mirror 2 can be hidden by a flap 3 pivotally mounted about a horizontal shaft 8.

In the invention, a control rod 4 is integrated inside the sun visor 1, this rod connecting the plate 11 (and the end secured thereto) to the nearer end of the shaft 8. The control rod 4 transmits the pivoting motion of the sun visor when it is folded up or down to a cam 5 which, in the example shown, is included in the plate 11.

As can be seen in FIG. 2, the rod 4 is terminated by a gear wheel 6 whose teeth mesh with teeth of a toothed sector 7 secured to the shaft 8 and to the flap 3. Thus, when the flap is raised, in the counter-clockwise direction, the gear wheel 6 turns in the clockwise direction driving the cam 6 in the same direction. The control rod 2 and the cam 5 always rotate in the same direction, and in the example shown in the clockwise direction. These two movements (lowering the sun visor 1, and then raising the covering flap 3) cause the cam 5 to take up the position shown in FIG. 3. That is to say that after rotation the top portion of the cam 5 lowers the flexible spring 13 which comes into contact with the spring 12, thereby closing a contact for electric current and serving to switch on light bulbs located in a dome light (not shown). The springs 12 and 13 constitute a switch in one of the conductors connecting the bulbs to the voltage source that is normally constituted by the vehicle battery. The bulbs remain on so long as the flap is open.

In the example shown, this electrical portion is mounted on the bodywork 14 by means of a clip 16 penetrating into a corresponding opening, the clip 16 bearing against the roof 15 so as to mask the assembly. The electrical conductors 12 and 13 are themselves secured inside the roof by a second clip 17, the wires being mounted between the bodywork 14 and the inside of the roof 15.

The dome light can be switched off by folding the flap 3 against the mirror 2. Under such circumstances, the movement of the flap 3 rotates the cam 5 through about one-fourth of a turn away from the position shown in FIG. 3, thereby causing it to take up the position shown in FIG. 4. The flexible spring 13 is released from contact with the cam 5 and because of its elasticity it moves away from the spring 12, thereby interrupting the flow of electrical current powering the lighting bulbs.

It is also possible to switch off the lighting merely by raising the sun visor 1, since during such movement the flap 3 bears against the roof 15, thereby ensuring that the light is switched off automatically.

In the invention, no electrical elements are included in the sun visor itself. The central plate 11 serves to secure the sun visor and provide it with an axis of rotation. It has electrical contacts suitable for switching on the dome light.

The device described above can be implemented whenever it is necessary to provide illumination for a limited length of time only, and numerous variants can be devised, in particular by substituting equivalent technical means, without thereby going beyond the ambit of the invention.

What is claimed is:

1. A device for controlling a dome light, the dome light being switched on by pivoting a flap protecting a courtesy mirror, wherein a control rod is disposed between a top corner of a sun visor and a control mechanism of the mirror operated by pivoting the flap, the control rod terminating at a free end spaced from the flap, in a cam that causes two electrical conductors to press against each other, the cam being controlled by a gear wheel mounted on the flap.

2. A device for controlling a dome light to be switched on by pivoting a flap covering a mirror on a sun visor, wherein a control rod extends between a top corner of the sun visor and a control mechanism coupled to the flap on the mirror, the control rod having a cam at the top corner that causes two electrical contacts to press together upon rotation of the control rod, rotation of the cam being controlled by a gear wheel mounted on the flap, wherein the control rod carries a gear wheel co-operating with the gear wheel mounted on the flap and the control rod carries the cam, the control rod and the cam rotating in a same direction.

3. A device according to claim 2, wherein the electrical conductors are mounted in a fixed position beside the sun visor.

4. A device for controlling a light to be switched on by pivoting a flap covering a mirror on a sun visor, comprising a controlling mechanism disposed in the sun visor, the controlling mechanism having a cam that is attached to the flap and is operable to close electrical contacts so as to turn on the light when the flap is in an opened position, wherein the cam of the controlling mechanism has a control rod disposed between a top corner of the sun visor and a control mechanism of the mirror, the control rod terminating at its free end at the cam, the cam being controlled by a gear wheel mounted on the flap.

* * * * *